United States Patent
Chen et al.

(10) Patent No.: US 12,440,439 B2
(45) Date of Patent: Oct. 14, 2025

(54) MESOPOROUS SPONGE SPICULE AND METHODS THEREOF

(71) Applicant: Xiamen University, Fujian (CN)

(72) Inventors: Ming Chen, Fujian (CN); Jialiang Zhang, Fujian (CN); Xuejiao Liang, Fujian (CN)

(73) Assignee: Xiamen University, Xiamen (CN)

( * ) Notice: Subject to any disclaimer, the term of this patent is extended or adjusted under 35 U.S.C. 154(b) by 209 days.

(21) Appl. No.: 17/566,752

(22) Filed: Dec. 31, 2021

(65) Prior Publication Data

US 2022/0125714 A1   Apr. 28, 2022

Related U.S. Application Data

(63) Continuation of application No. PCT/CN2019/108876, filed on Sep. 29, 2019.

(30) Foreign Application Priority Data

Jul. 16, 2019  (CN) .......................... 201910641196.5

(51) Int. Cl.
*A61K 9/00* (2006.01)
*A61K 31/37* (2006.01)
*A61K 47/24* (2006.01)
*A61K 47/46* (2006.01)

(52) U.S. Cl.
CPC ............ *A61K 9/0021* (2013.01); *A61K 31/37* (2013.01); *A61K 47/24* (2013.01); *A61K 47/46* (2013.01)

(58) Field of Classification Search
None
See application file for complete search history.

(56) References Cited

U.S. PATENT DOCUMENTS

| | | | |
|---|---|---|---|
| 2003/0157330 | A1 | 8/2003 | Ostafin et al. |
| 2013/0302611 | A1 | 11/2013 | Joo et al. |

FOREIGN PATENT DOCUMENTS

| | | |
|---|---|---|
| CN | 101391776 A | 3/2009 |
| CN | 101683983 A | 3/2010 |
| CN | 101683983 B * | 9/2011 |
| CN | 105749288 A | 7/2016 |
| CN | 105858669 A | 8/2016 |
| CN | 107970449 A | 5/2018 |
| EP | 2256088 A1 | 12/2010 |
| JP | 2014094171 A | 5/2014 |

OTHER PUBLICATIONS

Zhang et al., Skin Delivery of Hydrophilic Biomacromolecules Using Marine Sponge Spicules, 2017, Mol. Pharmaceutics, 14, 3188-3200, DOI: 10.1021/acs.molpharmaceut.7b00468, (Year: 2017).*
Tu et al., Mesoporous Silica Nanoparticle-Coated Microneedle Arrays for Intradermal Antigen Delivery, 2017, Pharm Res, 34, 1693-1706, DOI: 10.1007/s11095-017-2177-4 (Year: 2017).*
Tao et al., Understanding of physicochemical properties and anti-oxidant activity of ovalbumin-sodium alginate composite nanoparticle-encapsulated kaempferol/tannin acid, 2022, RSC Adv., 12, 18115-18126, DOI: 10.1039/d2ra02708a (Year: 2022).*
Stewart et al., Drug self-assembly for synthesis of highly-loaded antimicrobial drug-silica particles, 2018, Scientific Reports vol. 8, Article No. 895, DOI: 10.1038/s41598-018-19166-8 (Year: 2018).*
Thomas et al., Inclusion of poorly soluble drugs in highly ordered mesoporous silica nanoparticles, Int J Pharm. Mar. 15, 2010;387(1-2):272-7. DOI: 10.1016/j.ijpharm.2009.12.023 (Year: 2010).*
Ghasemi et al., Synthesis of hollow mesoporous silica (HMS) nanoparticles as a candidate for sulfasalazine drug loading, Ceramics International, vol. 43, Issue 14, Oct. 1, 2017, pp. 11225-11232, DOI: 10.1016/j.ceramint.2017.05.172 (Year: 2017).*
Croce et al., A Mesoporous Pattern Created by Nature in Spicules from *Thetya aurantium* Sponge, 2007, Biophys J., 92(1), 288-292, DOI: 10.1529/biophysj.106.094532 (Year: 2007).*
Jensen et al. "Biologically Formed Mesoporous Amorphous Silica." J. Am. Chem. Soc., 2009, 131: 2717-2721. (Year: 2009).*
International Search Report and English Translation cited in PCT/CN2019/108876 mailed Apr. 19, 2020, 6 pages.
Written Opinion cited in PCT/CN2019/108876 mailed Apr. 19, 2020, 4 pages.
Zhang, et al., "Skin delivery of hyaluronic acid by the combined use of sponge spicules and flexible liposomes", This journal is © The Royal Society of Chemistry 2019, rsc.li/biomaterials-science, vol. 7, No. 4, Apr. 2019, 13 pages.
Zhang, et al., "Skin Delivery of Hydrophilic Biomacromolecules Using Marine sponge spicules", pubs.acs.org/molecularpharmaceutics, 2017, pp. 3188-3200.

* cited by examiner

*Primary Examiner* — Doan T Phan
(74) *Attorney, Agent, or Firm* — Cooper Legal Group, LLC

(57) ABSTRACT

A mesoporous sponge spicule, a mesoporous material is synthesized on a surface of a sponge spicule to define the mesoporous sponge spicule.

14 Claims, 4 Drawing Sheets

Fig. 1A
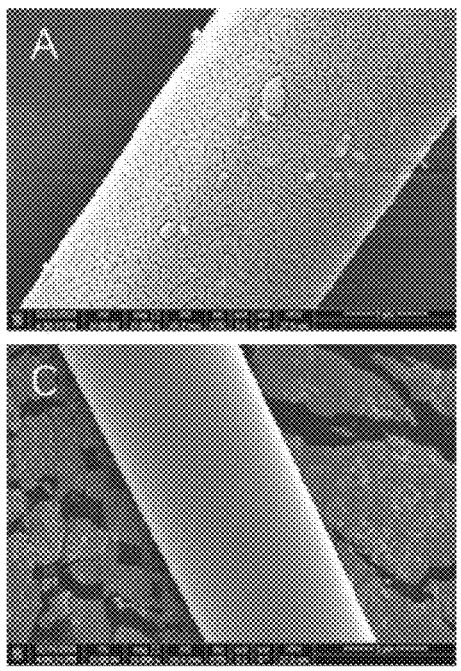
Fig. 1B
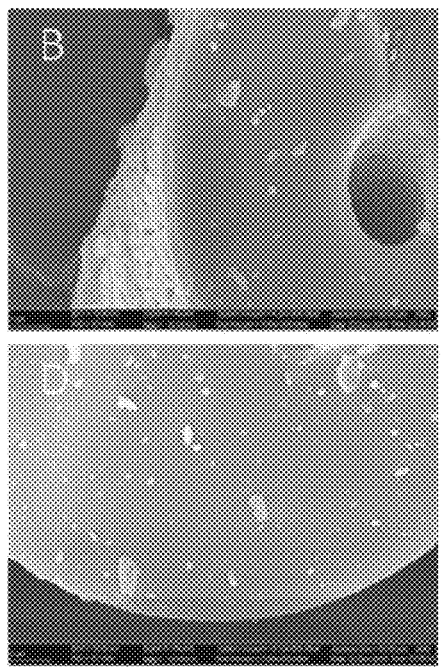
Fig. 1C
Fig. 1D
Fig. 2A
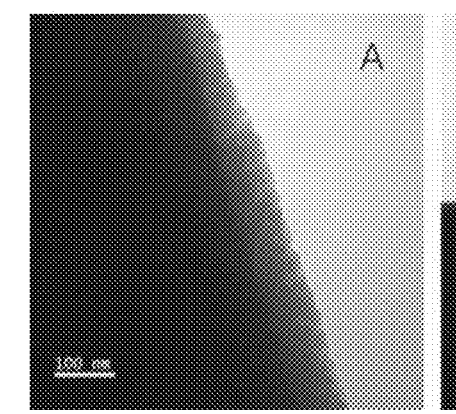
Fig. 2B
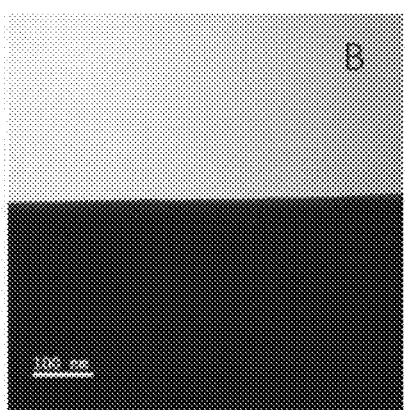

MESOPOROUS SPONGE SPICULE AND METHODS THEREOF

RELATED APPLICATIONS

This application is a continuation of International patent application PCT/CN2019/108876, filed on Sep. 29, 2019, which claims priority to Chinese patent application 201910641196.5, filed on Jul. 16, 2019. International patent application PCT/CN2019/108876 and Chinese patent application 201910641196.5 are incorporated herein by reference.

FIELD OF THE DISCLOSURE

The present disclosure relates to a mesoporous sponge spicule (a surface of a sponge spicule modified with mesoporous silica (mSS)).

BACKGROUND OF THE DISCLOSURE

Skin Drug Delivery has many unique advantages compared with other routes of administration, including: avoiding the first pass effect of the liver; drug absorption not being affected by the digestive tract environment and gastrointestinal function; sustained or controlled drug delivery; good patient compliance; and among others. However, the essence of the skin is a biological membrane barrier. Except for a very small number of drug molecules (with molecular weights less than 500 Da and moderate oil-water partition coefficients) that can pass through the skin stratum corneum barrier, most drug molecules have difficulty penetrating and being absorbed through the skin. Therefore, it is a challenging task to overcome the skin barrier and safely and effectively deliver various biomacromolecule drugs or active substances with different physical and chemical properties to a lesion through skin, and it has also been a research challenge and hot spot in the field of skin drug delivery.

Among all skin penetration enhancement technologies, microneedle technology is the most promising. Since its introduction in 1998, microneedle technology has gradually developed five categories, including solid microneedles, hollow microneedles, dissolving microneedles, coated microneedles, and phase-transition microneedles. They are mainly used for vaccination, insulin administration, and the treatment of skin diseases and others. However, microneedle technology still faces a series of challenges and bottlenecks in the treatment of skin diseases, including: the maintenance time of the micropores induced by the solid microneedle is too short, and the microchannel usually closes automatically within 20 minutes after the microneedle leaves the skin, which greatly limits the transdermal penetration and bioavailability of the drug. The administration area of microneedle patches (including dissolving microneedles, coated microneedles, hollow microneedles, etc.) is fixed and relatively small (usually 1 cm$^2$), which limits the use of the microneedle patches to the treatment of large-area skin lesions. Microneedles are usually arranged in an array, and it is difficult for the microneedle patches to apply on different surfaces and uneven areas such as the alar of the nose.

The applicant separated and purified the sponge spicule of *Haliclona* sp. (SHS) from artificially cultivated *Haliclona* sp., which had sharp ends, stable properties, and high mechanical strength (the content of SiO$_2$ is 95%), the sponge spicule of *Haliclona* sp. has a unified shape and is uniform in size (the sponge spicule of *Haliclona* sp. is about 120 μm in length and is about 7 μm in diameter). The sponge spicule of *Haliclona* sp. can be used as a microneedle technology to be applied to the skin to effectively promote the transdermal delivery of model drugs (S. Zhang, et al., 2017) and nanocarriers (C. Zhang, et al., 2019). The efficiency of SHS to deliver model drugs (e.g., dextran, which has a molecular weight of 10 kDa) on the skin of living mice is about 15 times that of commercial solid microneedles (Dermaroller® 200 μm). However, the use of SHS for skin administration still has many shortcomings, including: 1) the penetration enhancement effect of SHS decreases sharply with the increase of the molecular weight of the drug; 2) the entire administration procedure has to be divided into two steps, first SHS is used to pretreat the skin to open the skin channel and then the drug is applied on the surface of the pretreated skin, which is not convenient enough; and 3) the drug stays on the skin surface for a long time and needs to be gradually absorbed into the skin through the microchannel formed by SHS, during which some drugs will be degraded or inactivated.

BRIEF SUMMARY OF THE DISCLOSURE

The present disclosure provides a mesoporous sponge spicule.

In order to solve the technical problems, a technical solution of the present disclosure is as follows.

A mesoporous sponge spicule is provided. A mesoporous material is synthesized on a surface of a sponge spicule to define the mesoporous sponge spicule.

In a preferred embodiment, a specific surface area of the mesoporous sponge spicule is 5-500 m$^2$/g (e.g., 5-50 m$^2$/g).

In a preferred embodiment, the sponge spicule is a sponge spicule of *Haliclona* sp.

In a preferred embodiment, the mesoporous material comprises silica.

In a preferred embodiment, other mesoporous materials of the mesoporous material comprise at least one of mesoporous TiO$_2$, mesoporous Al$_2$O$_3$, mesoporous ZnS, mesoporous MnO$_2$, mesoporous ZnCrAlPO, or mesoporous CrAlPO, etc.

The present disclosure further provides a method for applying the mesoporous sponge spicule, comprising topically applying the mesoporous sponge spicule on skin by massaging, wherein the mesoporous sponge spicule functions as a carrier for transdermal delivery of a drug or an active substance.

The present disclosure further provides a method for applying the mesoporous sponge spicule, comprising topically applying the mesoporous sponge spicule on skin by massaging, wherein the mesoporous sponge spicule functions as a carrier for transdermal delivery of a lipophilic drug or a lipophilic active substance.

In a preferred embodiment, a molecular weight of the active substance is less than 2000 Da, and the active substance is configured to be loaded on the mesoporous sponge spicule.

In a preferred embodiment, the molecular weight of the active substance is less than 800 Da.

A further technical solution of the present disclosure is as follows.

A method for preparing a mesoporous sponge spicule, comprising:
1) adding 1 weight distribution of a sponge spicule into deionized water, a weight-volume ratio of the sponge spicule to the deionized water is 1:100-500 (kg/L), then adding a cationic surfactant in a weight amount of 0.1-2 times (e.g., 0.1-1 times) the sponge spicule, a certain amount of a hydrolysis-polymerization catalyst of a silicon source, and 100-1000 volume distribution of a small molecular alcohol, and stirring for 20-40 minutes to form a uniform solution;

2) dropping 0.1-1 volume distribution of the silicon source, then reacting at 30-100° C. (e.g., 30-80° C.) for 20-100 hours, washing with water to remove by-products, and aging at 100-120° C. overnight; and 3) removing the cationic surfactant to yield the mesoporous sponge spicule.

In a preferred embodiment, the cationic surfactant comprises cetyltrimethylammonium bromide (CTAB, CAS: 57-09-0) or cetyltrimethylammonium chloride (CTAC, CAS: 112-02-7).

In a preferred embodiment, the hydrolysis-polymerization catalyst of the silicon source is one of concentrated ammonia or sodium hydroxide, and a concentration of the sodium hydroxide or the concentrated ammonia is 20-50% and a volume of the sodium hydroxide or the concentrated ammonia is 0.01-0.5 volume distribution.

In a preferred embodiment, the silicon source comprises at least one of tetramethyl orthosilicate (TMOS, CAS: 681-84-5), tetraethyl orthosilicate (TEOS, CAS: 78-10-4), or tetrapropoxysilane (TPOS, CAS: 682-01-9).

In a preferred embodiment, removing the cationic surfactant comprises removing the cationic surfactant using solvent extraction, and the solvent extraction comprises refluxing at 70-95° C. for 10-15 hours 1-5 times; or removing the cationic surfactant comprises removing the cationic surfactant by a calcination method comprising calcinating at 500-600° C. for 6-10 hours.

In a preferred embodiment, the small molecular alcohol comprises at least one of methanol, ethanol, or isopropanol.

In a preferred embodiment, a solvent used in the solvent extraction comprises at least one of a mixture of an ethanol solution and 0.1-1 M (Mol/L) hydrochloric acid with a volume ratio of 5-15:1, a mixture of the ethanol solution and a 0.1-1 M ammonium nitrate solution with a volume ratio of 5-15:1, or a mixture of the ethanol solution and a 0.1-1 M sodium chloride solution with a volume ratio of 5-15:1.

Compared with the existing techniques, the present disclosure has the following advantages.

1. A mesoporous sponge spicule (mSS), especially a mesoporous sponge spicule of *Haliclona* sp. (mSHS) can penetrate stratum corneum to disrupt the skin barrier and be maintained in the stratum corneum for a long period (at least 72 hours) to form a large number of persistent microchannels, which is much higher than a residence time (20 minutes) of a microchannel after a traditional microneedle acts on a skin.

2. The mSS can be used alone or mixed with a variety of semi-solid preparations to be applied on any area and any uneven skin lesions.

3. The whole drug administration only has one step using massaging, which is convenient and quick.

4. Mesoporous materials have an ability to load multiple drugs at the same time, therefore, the mSS can also load multiple drugs at the same time and deliver the multiple drugs to the skin, which is expected to achieve a synergy for treatment of certain skin diseases.

5. Different drug molecules can be loaded into a mesoporous layer of a surface of the mSS, which effectively improves a solubility or a stability of the drug. The drug will penetrate the skin along with the mSS and will not be affected by physical-chemical properties of the drug and will be released from the mesoporous layer.

6. After the mSS acts on the skin, the mSS will automatically peel off of the skin with physiological exfoliation of keratinocytes (desquamation), and the skin barrier can be gradually reset without causing serious damage to the skin.

7. The mesoporous sponge spicule (mSS) of the present disclosure, especially the mesoporous sponge spicule of *Haliclona* sp. (mSHS) with the surface of the sponge spicule of *Haliclona* sp. (mSHS) modified with the mesoporous material can adsorb and load various drugs or various bioactive ingredients, especially poorly water soluble drugs. Therefore, the drugs or the bioactive ingredients can enter the skin along with the mesoporous sponge spicule and be then released from the mesoporous layer to the deep layer of the skin.

BRIEF DESCRIPTION OF THE DRAWINGS

FIGS. 1A-1D illustrate scanning electron microscope (SEM) results of a mesoporous sponge spicule of *Haliclona* sp. (mSHS) and a sponge spicule of *Haliclona* sp. (SHS) and a comparison thereof. FIGS. 1A and 1B respectively illustrate SEM visualization of a front surface and a cross-section of the mesoporous sponge spicule of *Haliclona* sp.; FIGS. 1C and 1D respectively illustrate SEM visualization of a front surface and a cross-section of the sponge spicule of *Haliclona* sp. FIG. 1A illustrates that a surface of the mesoporous sponge spicule of *Haliclona* sp. is modified with a layer of mesoporous material, and a cross-sectional view (FIG. 1B) illustrates that a surface of the sponge spicule of *Haliclona* sp. is successfully modified with a layer of the mesoporous material.

FIGS. 2A and 2B illustrate transmission electron microscopy (TEM) results of the mesoporous sponge spicule of *Haliclona* sp. (mSHS) and the sponge spicule of *Haliclona* sp. (SHS) and a comparison thereof. FIG. 2A illustrates TEM visualization of the mesoporous sponge spicule of *Haliclona* sp.; FIG. 2B illustrates TEM visualization of the sponge spicule of *Haliclona* sp. FIG. 2A illustrates that the surface of the sponge spicule of *Haliclona* sp. is modified by the mesoporous material.

FIG. 6A illustrates a fluorescence distribution of the Coumarin 6 from an mSHS @Coumarin 6 group in skin, FIG. 6B illustrates a fluorescence distribution of the Coumarin 6 from an SHS+the Coumarin 6 in skin (Coumarin 6 is applied after massaging by SHS) group, FIG. 6C illustrates a fluorescence distribution of the Coumarin 6 from a direct topical application, and FIG. 6D illustrates a fluorescence distribution from a pig skin in control.

FIG. 8A is loaded with 1 mg/mL, FIG. 8B is loaded with 2 mg/mL, FIG. 8C is loaded with 5 mg/mL, FIG. 8D is loaded with 10 mg/mL, FIG. 8E is loaded with 20 mg/mL, FIG. 8F is loaded with 30 mg/mL, and FIG. 8G is loaded with 40 mg/mL.

DETAILED DESCRIPTION OF THE EMBODIMENTS

Figure 3:
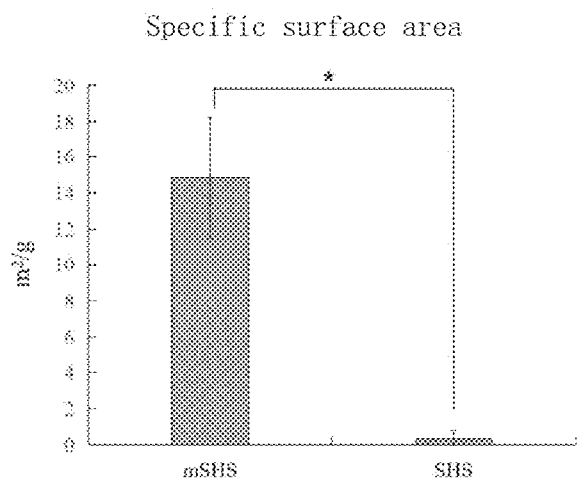
FIG. 3 illustrates specific surface areas of the mSHS and the SHS. After a surface of the SHS is modified by a layer of mesoporous silica, a specific surface area of an mSHS group is significantly higher than that of a SHS group. A mesoporous aperture of the mesoporous silica modified on the surface of the mSHS is analyzed by an automatic surface area analyzer to be 7.05 nm. * represents that the specific surface areas of the mSHS group and the SHS group are significantly different (p<0.05).

The present disclosure will be further described in combination with the accompanying embodiments and drawings.

Embodiment 1

A sponge spicule of *Haliclona* sp. with a surface modified with mesoporous silica is prepared as follows.

The sponge spicule of *Haliclona* sp.: a preparation method of the sponge spicule of *Haliclona* sp. may be found in CN201610267764.6, "A method for preparing sponge spicules with a high purity", which is incorporated herein by reference.

The following method can be used to prepare the sponge spicule of *Haliclona* sp. with the surface modified with mesoporous silica:

① 35 mL of deionized water and 80 mg of cetyltrimethylammonium bromide (CTAB, CAS: 57-09-0) or cetyltrimethylammonium chloride (CTAC, CAS: 112-02-7), concentrated ammonia (which also can be sodium hydroxide or hydrochloric acid) (3-10 μL, 20-50 wt %), and ethanol (10-100 mL) are added into 100 mg of the sponge spicule of *Haliclona* sp. and stirred for 30 minutes to form a uniform solution;

② 30-100 μL of tetramethyl orthosilicate (TMOS, CAS: 681-84-5) (which can also be tetraethyl orthosilicate (TEOS, CAS: 78-10-4) or tetrapropoxysilane (TPOS, CAS: 682-01-9)) is dropped into the uniform solution, then reacted at 30-100° C. for 20-100 hours, washed with water to remove by-products, and aged at 100-120° C. overnight to obtain an aged solution;

③ A surfactant is removed by solvent extraction, wherein a solvent for the solvent extraction can be a mixture solution of an ethanol solution and a hydrochloric acid solution (0.1 M (Mol/L)) (v/v, 10:1), a mixture solution of the ethanol solution and an ammonium nitrate solution (0.1 M) (v/v, 10:1), a mixture solution of the ethanol solution and a sodium chloride solution (0.1 M) (v/v, 10:1). The aged solution is repeatedly refluxed at 70-95° C. for 12 hours 3 times (the surfactant can also be removed by calcining at 550° C. for 8 hours).

In detail, in this embodiment, the sponge spicule of *Haliclona* sp. with the surface modified with the mesoporous silica is prepared as follows:

① 35 mL of the deionized water, 80 mg of the cetyltrimethylammonium bromide (CTAB), 10 μL of 25 wt % of the concentrated ammonia water, and 50 mL of the ethanol are added into 100 mg of the sponge spicule of *Haliclona* sp. and stirred for 30 minutes to form the uniform solution;

② 50 μL of the tetramethyl orthosilicate is dropped into the uniform solution, then reacted at 60° C. for 24 hours, washed with the water to remove the by-products, and aged at 100° C. overnight to obtain the aged solution;

③ The surfactant is removed by the solvent extraction, wherein the solvent is the mixture of the ethanol solution and the hydrochloric acid solution (0.1M) (v/v, 10:1). The aged solution is repeatedly refluxed at 90° C. for 12 hours 3 times to prepare the mesoporous sponge spicule of *Haliclona* sp.

The mesoporous sponge spicule is investigated by a scanning electron microscope, a transmission electron microscope, and an automatic surface area analyzer. The results are shown in FIGS. 1 and 2.

A comparison between specific surface areas of the mSHS and the SHS is shown in FIG. 3.

Embodiment 2

Coumarin 6 is used as a lipophilic model drug to study effectiveness of drug loading and transdermal delivery enhancement of the mSHS.

Figure 4:
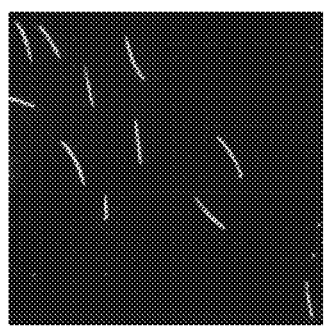
FIG. 4 illustrates an image of the mSHS loaded with Coumarin 6 (mSHS@Coumarin 6) using a confocal microscope.

① Drug loading process: dichloromethane is used as a solvent to prepare Coumarin 6 solutions with different concentrations. After 10 mg of the mSHS is placed into centrifuge tubes, 600 μL of the Coumarin 6 solutions with the different concentrations are respectively added, rotated, and shaken for 12 hours, and the drug loading process is complete. Mixed solutions of the mSHS and the Coumarin 6 are then centrifuged, supernatant drug solutions are completely removed, and drug-loaded mSHSes are placed in a fume hood to be naturally dried. That is, referring to FIG. 4, the mSHSes loaded with the Coumarin 6 (i.e., mSHS@Coumarin 6) are prepared.

Figure 7:
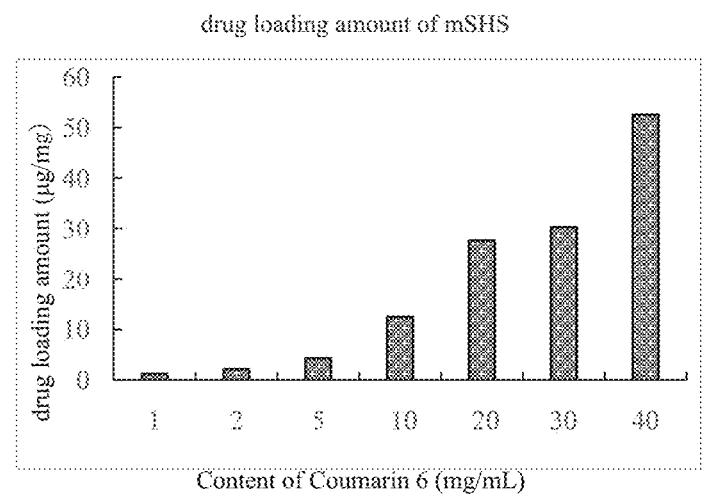
FIG. 7 illustrates an amount of drug loading of the mSHS with different Coumarin 6 concentrations.
Figure 8A:
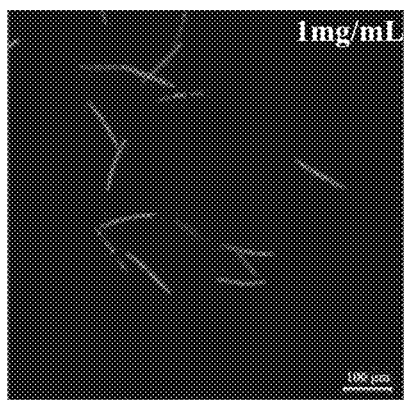
FIGS. 8A-8G illustrates a fluorescence intensities of the mSHS loaded with different Coumarin 6 concentrations.
Figure 8B:
Figure 8C:
Figure 8D:
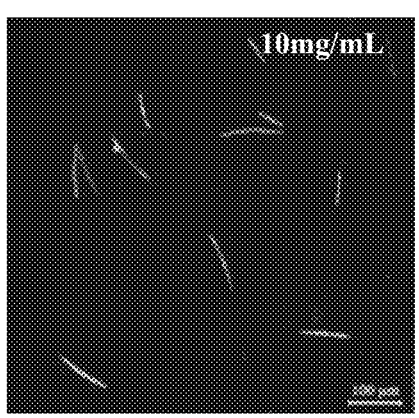
Figure 8E:
Figure 8F:
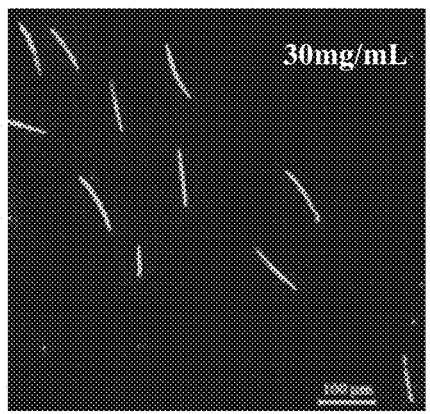
Figure 8G:
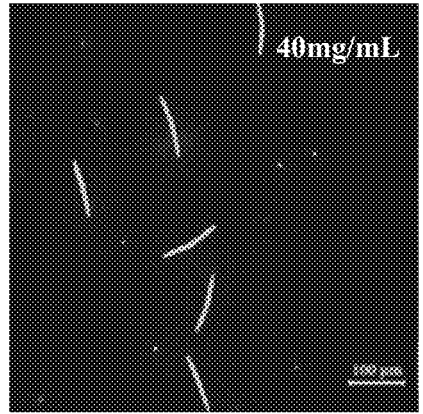

② The mSHS @Coumarin 6 are placed in ethanol solutions with certain amounts, placed on a shaker, and shaken for 12 hours (28° C., 200 rpm), and corresponding drug loading amounts of the mSHS are calculated out based on contents of the Coumarin 6 in the ethanol solutions. The result is shown in FIG. 7.

Quantitative Results of Drug Loading Amounts

Drug loading amounts: loaded masses of the Coumarin 6 per milligram of the mSHS (m)

TABLE 1

The drug loading amounts of the mSHS according to different concentrations of the Coumarin 6

| Concentration of Coumarin 6 | Drug loading amount (μg/mg) |
|---|---|
| 1 | 1.25 |
| 2 | 2.19 |
| 5 | 4.30 |
| 10 | 12.52 |
| 20 | 27.64 |
| 30 | 30.28 |
| 40 | 52.56 |

It can be seen from results of the drug loading amounts (Table 1 & FIG. 7), that when the concentration of the Coumarin 6 continues to increase, the Coumarin 6 loading amount of the mSHS also continues to increase. A final drug concentration of the Coumarin 6 is selected to be 40 mg/mL as an optimal drug loading concentration of the Coumarin 6 for loading on the mSHS due to a limited solubility of the Coumarin 6 in dichloromethane.

The Qualitative Results of the Drug Loading Amounts

Fluorescence intensities of the mSHS @Coumarin 6 are observed under a laser confocal microscope, and the results are shown in FIG. 8.

③ The mSHS @Coumarin 6 is applied in transdermal penetration enhancement experiments in vitro Loading conditions of the mSHS @Coumarin 6: the drug loading concentration is 40 mg/mL. The experiment is divided into three groups namely: a first group being an mSHS @Coumarin 6 group; a second group being an SHS+Coumarin 6 group; a third group being a Coumarin 6 only group. Among them, delivery system groups of the second group and the third group are saturated 30% ethanol solutions of the Coumarin 6, and delivery volumes are 200 pt.

A pig skin (i.e., a fresh pig skin) is cut into circular pieces with a diameter of 40 mm, subcutaneous fat tissues are removed, and pig hair is shaved to no longer than 2 mm. The pig skin is cleaned by clean water and placed on a Franz diffusion transdermal device, and air bubbles between the pig skin and a buffer solution in a receptor compartment are removed. 1 mL of the buffer solution is added into a donor compartment (with a diameter of 15 mm and a dosing area of 1.77 $cm^2$). A waveform generator and a multimeter are used to analyze a conductivity of the pig skin. An alternating current with 100 mV and 100 Hz is applied. When the alternating current through the pig skin is less than 10 μA, it indicates that a barrier function of a skin stratum corneum is intact and can be used for experiments, and the buffer solution on the pig skin is then removed and set aside for future use. In experiments of the first group, 10 mg of the mSHS @Coumarin 6 is added into the donor compartment, and the pig skin is then massaged by a mini massage device or manual massage for 2 minutes, and a transdermal delivery is then directly applied for 16 hours. In experiments of the second group, 10 mg of the SHS is added into the donor compartment, and a section of the pig skin is then massaged by a mini massage device or manual massage for 2 minutes. After the massage, a skin of the section is washed by the buffer solution or the water to remove residual SHS, 200 μL of Coumarin 6 solution (saturated 30% ethanol solution of the Coumarin 6) is then added on the skin (i.e., the donor compartment), a liquid (i.e., the Coumarin 6 solution) is evenly spread on the skin treated by the SHS, and a transdermal delivery is applied for 16 hours. In experiments of the third group, 200 μL of the Coumarin 6 solution (the saturated 30% ethanol solution of the Coumarin 6) is directly added on the skin, the liquid (i.e., the Coumarin 6 solution) is evenly spread on a surface of the skin for 16 hours, and transdermal delivery is applied for 16 hours. After the transdermal experiment, a sample in the receptor compartment (Rec) is taken. The pig skin is washed by the buffer solution five times. Two methods are used to analyze penetration enhancement effects of the Coumarin 6. (1) The treated skin (i.e., the section) is cut off, 10 layers of stratum corneum are serially peeled off using a tape peeling method, an epidermal layer is scrapped, and a dermal layer is chopped. The aforementioned layers are divided into groups, soaked in 4 mL of a mixture of the phosphate buffer solution and methanol (a volume ratio is 1:1) to respectively extract the Coumarin 6 in a $1^{st}$ layer of stratum corneum (SC1), $2^{nd}$-$5^{th}$ layers of stratum corneum (SC2), $6^{th}$-$10^{th}$ layers of stratum corneum (SC3), the epidermal layer (Epi), and the dermal layer (Der) at 200 r/min (revolutions per minutes (rpm)) at room temperature (e.g., 20-30° C.). Contents of the Coumarin 6 in all skin tissue layers and the receptor compartment are read and analyzed by a full-wavelength microplate reader. (2) A tissue block with a diameter of 5 mm is cut from the skin of the dosing section using a punch and quickly frozen in a freezing embedding agent. An embedding block embedded with the tissue block is cut into thin slices with a thickness of 20 μm on a cryostat microtome, the slices are sealed using neutral balsam, and fluorescence intensities of different skin layers is observed using a confocal microscope.

TABLE 2

Contents of the Coumarin 6 in all skin layers (μg/1.77 $cm^2$) (transdermal for 16 h)

| group | SC1 | SC2 | SC3 | Epi | Der | Rec | Total |
|---|---|---|---|---|---|---|---|
| mSHS | 0.139 ± 0.038 | 0.258 ± 0.076 | 0.228 ± 0.049 | 13.272 ± 2.716 | 0.936 ± 0.261 | 0.253 ± 0.137 | 15.085 ± 2.955 |
| SHS | 0.003 ± 0.000 | 0.014 ± 0.001 | 0.025 ± 0.007 | 0.035 ± 0.003 | 0.007 ± 0.004 | 0.156 ± 0.025 | 0.241 ± 0.025 |
| Control | 0.005 ± 0.001 | 0.009 ± 0.002 | 0.019 ± 0.003 | 0.021 ± 0.007 | 0.015 ± 0.011 | 0.130 ± 0.043 | 0.199 ± 0.047 |

From the quantitative results, the transdermal amount of the mSHS group is much higher than the transdermal amount of the other two groups while the Coumarin 6 is mainly accumulated in the epidermal layer. This effect is also found during the experimentation, and the content of the epidermal layer is significantly higher. There is no significant difference in the contents of the three groups in the receptor compartment. It may be found that lipophilic substances had more difficulty reaching deep layers of the skin than water-soluble substances and mostly accumulated on surface layers of the skin.

Figure 5:
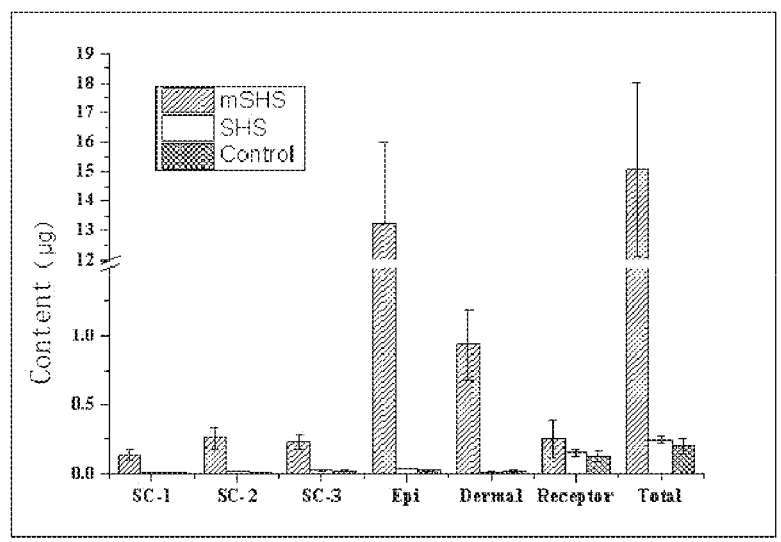
FIG. 5 illustrates a content distribution (μg) of Coumarin 6 in all skin layers (transdermal delivery for 16 hours).
Figures 6A, 6B, 6C, 6D:
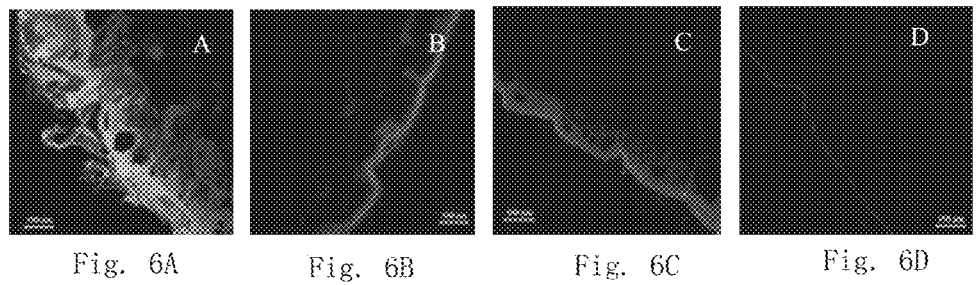
FIGS. 6A-6D illustrate fluorescence distribution of the Coumarin 6 in different skin layers.

Referring to the quantitative results in FIG. 5, a total transdermal amount of the mSHS group is much higher than a total transdermal amount of the other two groups. Drugs (i.e., the Coumarin 6) are mainly accumulated in the epidermal layer. There is no significant difference in the contents of the three groups in the receptor compartment. Compared with the water-soluble substances, the lipophilic substances had more difficulty reaching the deep layers of the skin and mostly accumulated on the surface layers of the skin. It can be seen from the results that the mSHS technology significantly promotes transdermal delivery effects of the Coumarin 6.

Referring to a fluorescence distribution of the Coumarin 6 in the pig skin in FIGS. 6A-6D, the fluorescence intensities of the mSHS @Coumarin 6 group are much higher than the fluorescence intensities of the other two groups (FIGS. 6B and 6C), which indicates that the mSHS loaded with the Coumarin 6 can significantly improve a solubility and a transdermal absorption amount of the Coumarin 6. In the three transdermal delivery methods, the Coumarin 6 are mainly accumulated in the epidermal layers of the skin, and the content of the dermal layer is not high.

The aforementioned embodiments are merely some embodiments of the present disclosure, and the scope of the disclosure of is not limited thereto. Thus, it is intended that the present disclosure cover any modifications and variations of the presently presented embodiments provided they are made without departing from the appended claims and the specification of the present disclosure.

What is claimed is:

1. A mesoporous sponge spicule, comprising:
a mesoporous material layer on an outer wall of a sponge spicule, wherein the mesoporous material layer comprises mesoporous silica, the sponge spicule is a sponge spicule of *Haliclona* sp, and a specific surface area of the mesoporous sponge spicule is 5-50 $m^2/g$.

2. The mesoporous sponge spicule according to claim 1, wherein the mesoporous material layer further comprises at least one of mesoporous $TiO_2$, mesoporous $Al_2O_3$, mesoporous ZnS, mesoporous $MnO_2$, mesoporous ZnCrAlPO, or mesoporous CrAlPO.

3. A method for transdermal delivery of a drug or an active substance to skin, the method comprising topically applying the mesoporous sponge spicule according to claim 1 to the skin by massaging, wherein the mesoporous sponge spicule is loaded with the drug or the active substance.

4. A method for transdermal delivery of a lipophilic drug or a lipophilic active substance to skin, the method comprising topically applying the mesoporous sponge spicule according to claim 1 to the skin by massaging, wherein the mesoporous sponge spicule is loaded with the lipophilic drug or the lipophilic active substance.

5. A method for preparing the mesoporous sponge spicule according to claim 1, the method comprising:
I) adding 1 weight distribution of the sponge spicule into deionized water, a weight-volume ratio of the sponge spicule to the deionized water is 1:100-500, then adding a cationic surfactant in a weight amount of 0.1-2 times the sponge spicule, a hydrolysis-polymerization catalyst of a silicon source, and 100-1000 volume distribution of a small molecular alcohol, and stirring for 20-40 minutes to form a uniform solution;
II) dropping 0.1-1 volume distribution of the silicon source into the uniform solution, then reacting at 30-80° C. for 20-100 hours, washing with water to remove by-products, and aging at 100-120° C. overnight; and
III) removing the cationic surfactant, and synthesizing a mesoporous material layer on an outer wall of the sponge spicule so as to yield the mesoporous sponge spicule, wherein the mesoporous material layer comprises mesoporous silica, the sponge spicule is a sponge spicule of *Haliclona* sp, and a surface area of the mesoporous sponge spicule is 5-50 $m^2/g$.

6. The method according to claim 5, wherein the cationic surfactant comprises cetyltrimethylammonium bromide or cetyltrimethylammonium chloride.

7. The method according to claim 5, wherein:
the hydrolysis-polymerization catalyst of the silicon source is one of concentrated ammonia or sodium hydroxide, and
a concentration of the sodium hydroxide or the concentrated ammonia is 20-50% and a volume of the sodium hydroxide or the concentrated ammonia is 0.01-0.5 volume distribution.

8. The method according to claim 5, wherein the silicon source comprises at least one of tetramethyl orthosilicate, tetraethyl orthosilicate, or tetrapropoxysilane.

9. The method according to claim 5, wherein:
removing the cationic surfactant comprises removing the cationic surfactant using solvent extraction, and the solvent extraction comprises refluxing at 70-95° C. for 10-15 hours 1-5 times; or
removing the cationic surfactant comprises removing the cationic surfactant by a calcination method comprising calcinating at 500-600° C. for 6-10 hours.

10. The method according to claim 9, wherein a solvent used in the solvent extraction comprises at least one of a mixture of an ethanol solution and 0.1-1 M (Mol/L) hydrochloric acid with a volume ratio of 5-15:1, a mixture of the ethanol solution and a 0.1-1 M ammonium nitrate solution with a volume ratio of 5-15:1, or a mixture of the ethanol solution and a 0.1-1 M sodium chloride solution with a volume ratio of 5-15:1.

11. The method according to claim 9, wherein the small molecular alcohol comprises at least one of methanol, ethanol, or isopropanol.

12. The method according to claim 3, wherein:
a molecular weight of the active substance is less than 2000 Da, and
the active substance is loaded on the mesoporous sponge spicule.

13. The method according to claim 3, wherein a molecular weight of the active substance is less than 800 Da.

14. The mesoporous sponge spicule according to claim 1, wherein the specific surface area of the mesoporous material layer is higher than a specific surface area of a surface of the sponge spicule.

* * * * *